Figure 1:
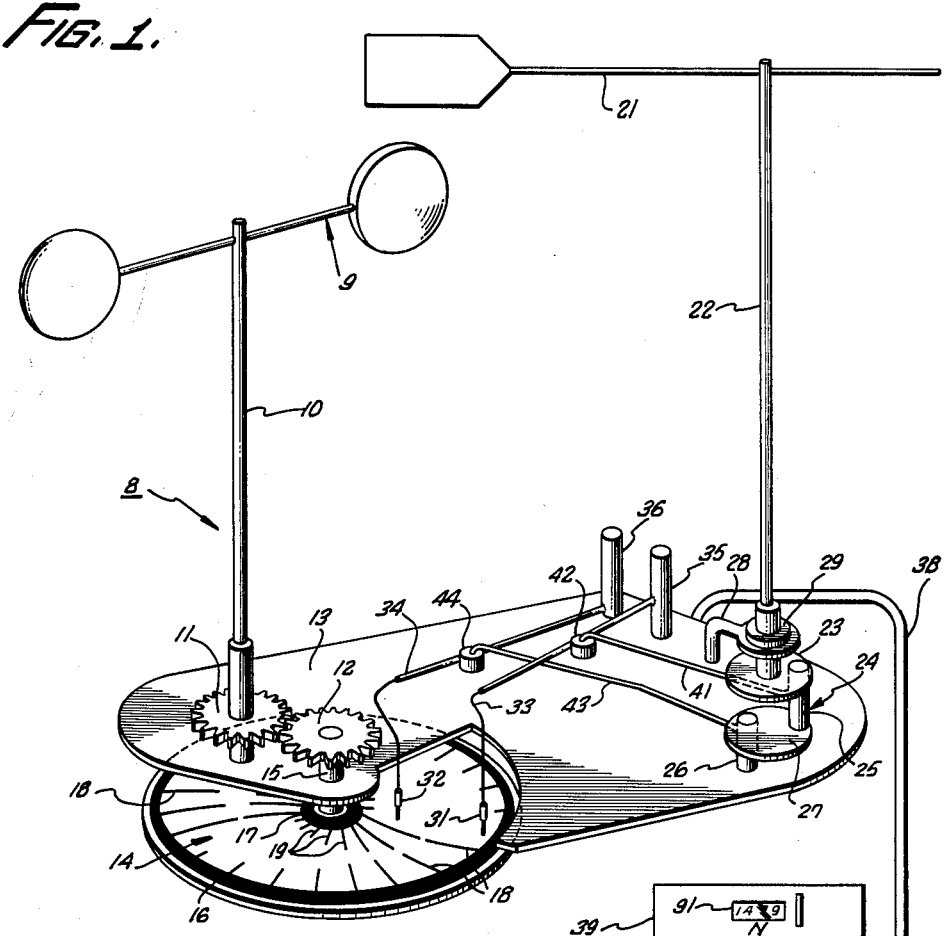

March 5, 1963

P. B. MacCREADY, JR 3,079,794

ANALOG DIGITAL FUNCTION PRODUCT INTEGRATOR

Filed Feb. 1, 1960

INVENTOR.
PAUL B. MacCREADY, JR.
BY
*Christie, Parker & Hale*
ATTORNEYS.

3,079,794
Patented Mar. 5, 1963

3,079,794
ANALOG DIGITAL FUNCTION PRODUCT INTEGRATOR
Paul B. MacCready, Jr., 1065 Armada Drive, Pasadena, Calif.
Filed Feb. 1, 1960, Ser. No. 5,972
10 Claims. (Cl. 73—189)

This invention relates generally to analog to digital converters and product integrators of the type producing digital indications of variables introduced in analog form, and integrating the product of the variables, and, in a particular embodiment, to such devices in which direction and velocity products are integrated with respect to time to indicate cumulative motion.

According to the invention a detection means senses the passage of indications on a member. The indications vary in length according to a preselected code. Rotary relative movement, the rate of which is a function of a first variable, is initiated between the detection means and the coded indications. Since the indications are of different lengths, the numbers of indication passages sensed by the detection means during a complete rotation of the coded indications depends upon the lateral positioning of the detection means with respect thereto. Means are provided to vary the lateral position of the detection means as a function of the second variable. An electrical output circuit is connected to the detection means to produce an output signal for each sensing by detection means of the passage thereby of an indication. The number of output signals produced in a given time indicates the integrated product of the two variables.

In a modification of the basic invention, the indications are divided into two isolated groups. Two distinct variable product conditions may be integrated. For example, one group may be utilized to indicate a positive product and the other group may be utilized to indicate a negative product. By appropriate electrical output circuitry, output signals indicative of the polarity as well as the magnitude of the integrated product are produced in such a device.

Two product integrators can be cascaded to provide product integration of an integrated product with respect to a third variable. A series of product integrators according to the invention can be cascaded or cross-connected as desired to provide for any particular integration operation as may be required for any number of variables.

In a particularly useful embodiment, two detection means are utilized in connection with the same set of indications, the indications being divided into two isolated groups. The two detection means can then provide, simultaneously, two different functions of the same variable. For example, direction of motion is normally expressed in a polar coordinate system which is converted to a rectangular coordinate system for ease of computation. By utilizing one detection means to convert a velocity variable, $V$, moving at an angle $\theta$ with respect to a base direction, north for example, to the sine of the angle $\theta$, i.e. $V$ sine $\theta$, and utilizing the second detection means to produce the cosine velocity component, i.e. $V$ cosine $\theta$, the electrical output circuits will produce outputs, the vectorial sum of which is the integrated product of the movement for any selected time. Such a system may be used, for example, as a dead reckoning tracer in navigation, and is generally utilizable to measure movement of any mass with respect to any given point.

Figure 2:
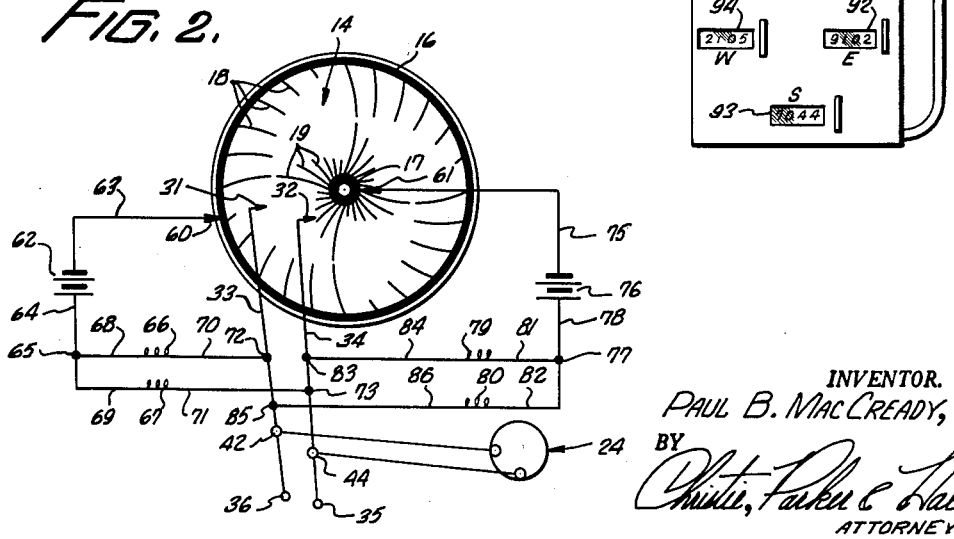

The invention may be more readily understood by referring to the accompanying drawing in which:

FIGURE 1 is a view in partial perspective of a device according to the invention for determining the total wind vector over a given time interval; and FIGURE 2 is a schematic diagram of the electrical and mechanical circuitry of the device of FIG. 1.

Referring now to FIG. 1, a wind measuring device includes anemometer cups 9, which are connected by a shaft 10 to a transfer gear 11. The transfer gear 11 is held in position on a support plate 13 by conventional ball bearing means (not shown). The transfer gear 11 engages a drive gear 12 which drives a coded disk 14 by means of a drive shaft 15 connected to the support plate 13 by conventional ball bearing means (not shown). The gear system 11, 12 represents any conventional torque transfer means. The coded disk 14 has an outer electrical conducting band 16 extending around its periphery and an interconducting band 17 in the central portion of the disk 14. A first series of electrical conducting lines 18 extend inwardly from the outer conducting ring 16 and a second series of electrical conducting lines 19 extend outwardly from the inner conducting ring 17.

A wind vane 21 is connected by means of a shaft 22 to a support disk 23. A double crank 24 consists of a first crank shaft 25 attached to the support disk 23. A second crank shaft 26 is attached to a connected disk 27 which, in turn, is attached to the first crank shaft 25. A support post 28 is attached to the support plate 13 and holds the wind vane assembly in place while allowing the free rotation thereof by ball bearing assembly 29.

A first electrical contact 31 and a second electrical contact 32 ride against the surface of the disk 14 so as to contact the lines 18 and 19 as the disk is rotated. The electrical contacts 31 and 32 are held in position by first and second contact arms 33 and 34, respectively. The contact arms 33 and 34 are supported by first and second pivots 35 and 36, respectively, which are attached to the support plate 13. The contact arms 33 and 34 also have electrical terminals (see FIG. 2) for completing electrical circuits through an output cord 38 to an output counter 39. A first crank arm extension 41 connects the first crank 25 to the first contact arm 33 at a first rotatable joint 42. A second crank arm extension 43 connects the second crank 26 to the second contact arm 34 at a second rotatable joint 44.

FIGURE 2 is a schematic diagram of the converter circuit for this embodiment. A first circuit contact 60 rides against the disk outer ring 16 and a second circuit contact 61 rides against the disk inner ring 17. The first circuit contact 60 is connected to a battery 62 by a first lead 63. The battery is also connected by lead 64 to a junction 65. A first output circuit 66 and a second output circuit 67 are connected to the junciton 65 by leads 68 and 69, respectively. A lead 70 connects the first output circuit 66 to the first contact arm 33 at a terminal 72 and a lead 71 connects second output circuit 67 to the second contact arm 34 at a terminal 73. A lead 75 connects the second circuit contact 61 to a battery 76. The battery 76 is also connected to a terminal 77 by lead 78. A third output circuit 79 and a fourth circuit 80 are connected to junction 77 by leads 81 and 82, respectively. The third output circuit 79 is connected to the second contact arm 34 at a terminal 83 by lead 84 and the fourth output circuit 80 is connected to the first contact arm 33 at a terminal 85 by lead 86.

The output counter 39 actually consists of four individual counters 91, 92, 93, and 94. In this particular embodiment the counter 91 is driven by the output circuit 66 and the counter 93 by the output circuit 80, these being the two output circuits being associated with the first contact arm 33, which is arbitrarily selected as north-south arm. Similarly, the east and west counters 92 and 94 are driven by output circuits 67 and 79, respectively.

The output circuits shown in this embodiment are utilized to drive different independent counters. However, by proper selection of battery polarity and by combining the output circuits, which may consist for example of deflection coils or pulse transformers, pulses are generated which are used to indicate which of the two output circuits associated with a contact is energized.

In actual operation it is, of course, preferable to shield the moving parts of the device 8, other than the anemometer cups 9 and wind vane 21, from the elements. The wind striking the anemometer cups 9 causes rotation of the shaft 10 and thus the transfer gear 11. The transfer gear 11 meshes with the drive gear 12 which rotates the coded disk 14 at a rate proportional to the velocity of the wind causing rotation of the anemometer cups 9. The wind vane 21 points in a direction from which the wind flows, causing the appropriate angular rotation of the arm 22 to be applied to the crank 24. In this embodiment the two crank arms 25 and 26 are displaced 90° from each other and the support 28 is positioned so that the crank arms 25 and 26 moves in a circular fashion. The crank arm extensions 41 and 43 transform this circular motion into a one dimensional sinusoidal trace, so that the junctions 42 and 44 move reciprocally rather than circularly.

The operation of the wind device 8 will now be described. The outer ring 16 is assumed to represent a trigonometric function value of +1, and the inner ring 17, a value of −1. The device 8 is positioned so that the wind vane 21 points north when the contact 31 is at its closest proximity to the outer ring 16, at which time the contact 32 will be positioned in the small space between the two sets of lines 18 and 19. Rotation of the disk will then cause the contact 31 to contact a maximum number of lines 18, selected arbitrarily as positive lines, and contact 32 to contact no lines. The electrical output signal produced by the battery 62 in the output circuit 66, corresponding to the cosine of $\theta$, in this case, 0°, of +1 or a maximum number of contact indications. The actual number of counts per unit time is then dependent upon the rate of rotation of the disk 14. Movement of the wind vane to indicate wind from the northeast, i.e., $\theta=45°$, will move the contact 31 to a position seven-tenths of the distance between the central portion between the lines 18 and 19 and the outer ring 16. The contact 32 will move seven-tenths of the distance out toward the outer ring 16. Each of the contacts 31 and 32 will then contact the same number of lines. The electrical signal output due to contact by contact 32 is now also produced in output circuit 67, and the east counter 92 registers such signals. The output from the contact 31 continues to be registered in the north counter 91 by the output signals being produced in the output circuit 66. Thus, output signals will be registered simultaneously in no more than two of the counters 91—94, and the actual number of counts registered in any one counter will be a function of the wind velocity and direction.

In the embodiment just described, the contacts 31 and 32 move sinusoidally, and the lines vary linearly in length. An alternate arrangement provides for the contacts 31 and 32 to move linearly in response to wind direction and the lines to vary sinusoidally in length. It is to be appreciated that the only purpose in varying either the lines or the contact movement sinusoidally is to generate the sine and cosine functions. Thus, according to the invention the lines and the contacts are shaped to generate the function desired. In addition, the rate of drive the disk 14 need not be linear with respect to the wind velocity, but may be made some other function thereof. Furthermore, while a disk 14 is shown, it is to be appreciated that a cylinder can equally well be utilized to provide the rotary motion between the lines and the contacts. The lines need not be rotated, but can be stationary, and the contacts rotate at a rate which is a function of the first (wind velocity) variable. While electrical lines of contact have been shown as the code indications for enabling the detection means to sense the passage of the indications, various other systems are equally applicable. For example, transparent portions of the disk or other structure can be utilized to pass light to a photo-electric cell; a transducer can sense the passage of magnetized indications; or a ratchet can be actuated by solid indications. In the particular embodiment shown in the drawing, two sets of lines are utilized so as to provide a means for directional indication. Only two of the four output circuits are energized at any one time. By utilizing miniature switches, such as those sold under the mark "Micro-Switch," to indicate the polarity of the angular function or actuate the output circuits, only one set of indications need be utilized. The switches are then actuated by the wind vane movement so as to provide for the necessary uniqueness of the output signals. Of course, the accuracy of the device is dependent upon the number of indications included in any one set of indications and the number of sets of indications provided on the disk. Therefore, the scope of the invention is not to be considered limited to the use of the described structure or to use in the measurement of wind.

I claim:

1. An analog to digital converter for wind flow measurement comprising means for measuring wind velocity, means for measuring wind direction, a coded rotatable member having a plurality of first indications of preselected different lengths and a plurality of second indications of preselected different lengths isolated from said first indications, means for rotating the coded member at a rate which is a function of wind velocity, a first electrical circuit including first output means and first detection means, said first detection means being positioned with respect to the indications so as to be responsive to the passage thereby of said first indications to produce a first electrical output signal indicative thereof in said first output means and to the passage thereby of said second indications to produce a second electrical output signal indicative thereof in said first output means, means for positioning said first detection means in response to wind direction so that wind from either of a first pair of adjacent quadrants positions said first detection means so as to produce a first electrical output signal and wind from the remaining quadrants positions said first detection means so as to produce a second electrical output signal, a second electrical circuit including second output means and second detection means, said second detection means being positioned so as to be responsive to the passage thereby of said first indications to produce a third electrical output signal indicative thereof in said second output means and to the passage thereby of said second indications to produce a fourth electrical output signal indicative thereof in said second output means, means for positioning said second detection means in response to wind direction so that wind from either of a second pair of adjacent quadrants, one and only one of which is also a quadrant in the first pair of quadrants, positions said second detection means so as to produce a third electrical output signal and wind from the remaining quadrants positions said second detection means so as to produce a fourth electrical output signal.

2. A converter as described in claim 1 in which the indications vary linearly in length, and the movement of the first and second detection means in response to wind direction varies sinusoidally.

3. A converter as described in claim 1 in which the indications vary sinusoidally in length and the positioning of the first and second detection means in response to wind direction varies linearly.

4. A converter as described in claim 1 in which said first output means includes a first counter for counting said first electrical output signals and a second counter for counting said second electrical output signals and said second output means includes a third counter for counting said third electrical output signals and a fourth counter for counting said fourth electrical output signals.

5. A converter as described in claim 4 in which the indications vary linearly in length and the movement of the first and second detection means in response to wind direction varies sinusoidally.

6. A converter as described in claim 4 in which the indications vary sinusoidally in length and the positioning of the first and second detection means in response to wind direction varies linearly.

7. A converter as described in claim 5 in which the first pair of quadrants are selected to be the northern quadrants and the second pair of quadrants are selected to be the eastern quadrants.

8. A converter as described in claim 6 in which the first pair of quadrants are selected to be the northern quadrants and the second pair of quadrants are selected to be the eastern quadrants.

9. An analog to digital converter for wind flow measurement comprising means for measuring wind velocity, means for measuring wind direction, a coded rotatable member having a plurality of indications of preselected different lengths, means for rotating the coded member at a rate which is a function of wind velocity, a first electrical circuit including first detection means positioned with respect to the indications so as to be responsive to the passage thereby of said indications to produce a first electrical output signal indicative thereof when the wind is from one of a first pair of adjacent quadrants and to produce a second electrical output signal indicative thereof when the wind is from the remaining quadrants, a second electrical circuit including second detection means positioned so as to be responsive to the passage thereby of said indications to produce a third electrical output signal indicative thereof when the wind is from a second pair of adjacent quadrants and to produce a fourth electrical output signal indicative thereof when the wind is from the remaining quadrants, one and only one of which is also a quadrant in the first pair of quadrants.

10. A converter as described in claim 9 and including a first counter for counting said first electrical output signals, a second counter for counting said second electrical output signals, a third counter for counting said third electrical output signals, and a fourth counter for counting said fourth electrical output signals.

References Cited in the file of this patent

UNITED STATES PATENTS

| | | |
|---|---|---|
| 2,236,114 | Randl | Mar. 25, 1941 |
| 2,375,227 | Hillman | May 8, 1945 |
| 2,510,384 | Dehmel | June 6, 1950 |
| 2,820,363 | McConica | Jan. 21, 1958 |

FOREIGN PATENTS

| | | |
|---|---|---|
| 8,652 | Sweden | Jan. 15, 1898 |

OTHER REFERENCES

Whitaker: "A Vectorially Integrating Anemometer," Journal of Scientific Instruments & Physics in Industry, vol. 26, pages 377, 378, November 1949.